United States Patent
Halttunen

(10) Patent No.: US 6,947,067 B2
(45) Date of Patent: Sep. 20, 2005

(54) METHOD OF TRANSFERRING DATA OF SCREEN AND VOICE OF MOBILE PHONE TO A NORMAL ANALOG TELEVISION RECEIVER WITH AN ADAPTER

(76) Inventor: Lasse Halttunen, Kukkakatu 4, FIN-04430 Järvenpää (FI)

( * ) Notice: Subject to any disclaimer, the term of this patent is extended or adjusted under 35 U.S.C. 154(b) by 178 days.

(21) Appl. No.: 10/432,724

(22) PCT Filed: Nov. 27, 2001

(86) PCT No.: PCT/FI01/01028
§ 371 (c)(1),
(2), (4) Date: May 27, 2003

(87) PCT Pub. No.: WO02/43389
PCT Pub. Date: May 30, 2002

(65) Prior Publication Data
US 2004/0032484 A1 Feb. 19, 2004

(30) Foreign Application Priority Data
Nov. 27, 2000 (FI) .............................................. 20002598

(51) Int. Cl.⁷ ................................................ H04N 7/14
(52) U.S. Cl. ................................... 348/14.02; 715/716
(58) Field of Search .......................... 348/14.01–14.16; 379/90.01, 110.01; 455/556.1–557; 715/716; 725/105, 131, 82

(56) References Cited

U.S. PATENT DOCUMENTS

| | | | | |
|---|---|---|---|---|
| 6,172,673 | B1 | * | 1/2001 | Lehtinen et al. ............ 715/716 |
| 6,524,189 | B1 | * | 2/2003 | Rautila ........................ 463/40 |
| 6,530,085 | B1 | * | 3/2003 | Perlman ...................... 725/82 |
| 2001/0047441 | A1 | * | 11/2001 | Robertson .................... 710/65 |

FOREIGN PATENT DOCUMENTS

| | | |
|---|---|---|
| EP | 0971327 A2 | 1/2000 |
| EP | 0999678 A2 | 5/2000 |
| EP | 1033832 A2 | 9/2000 |
| EP | 1035712 A2 | 9/2000 |
| EP | 1059809 A2 | 12/2000 |

* cited by examiner

Primary Examiner—Wing Chan
(74) Attorney, Agent, or Firm—Connolly Bove Lodge & Hutz LLP; Myron K. Wyche

(57) ABSTRACT

The invention relates to a method for transmitting image and sound from a mobile phone to an ordinary analog television receiver using a mobile phone accessory. The invention relates to third generation UMTS-/IMT 2000 data terminal equipments, all kinds of GSM-applications, such as: WAP, HSCSD, GPRS, EDGE and CDMA-phones. The invention is based on that the accessory module (2) is attached to an ordinary analog television receiver (3). Bluetooth technology is exploited in data transmission from the mobile phone to the accessory attachable to the television. Because of its function, smallness and essence the accessory module is suitable as mobile phone accessory. The accessory module uses supply current. The module operating as an accessory comprises in addition to the actual modification part, also a Bluetooth accessory, which receives image and sound transmitted by the modile phone, e.g. UMTS data terminal equipment. The modification part converts signals conformable to each equipment type to RGB-controlling signals and sound. The Bluetooth receiver in the module is attached to the converter by using an interface conformable to USB-standard. The Bluetooth accessory is attached to the mobile phone, this accessory can forward image and sound received by the mobile phone to the television receiver module nearby in the air interface in the free 24 Ghz frequency band.

7 Claims, 1 Drawing Sheet

Figure 1:
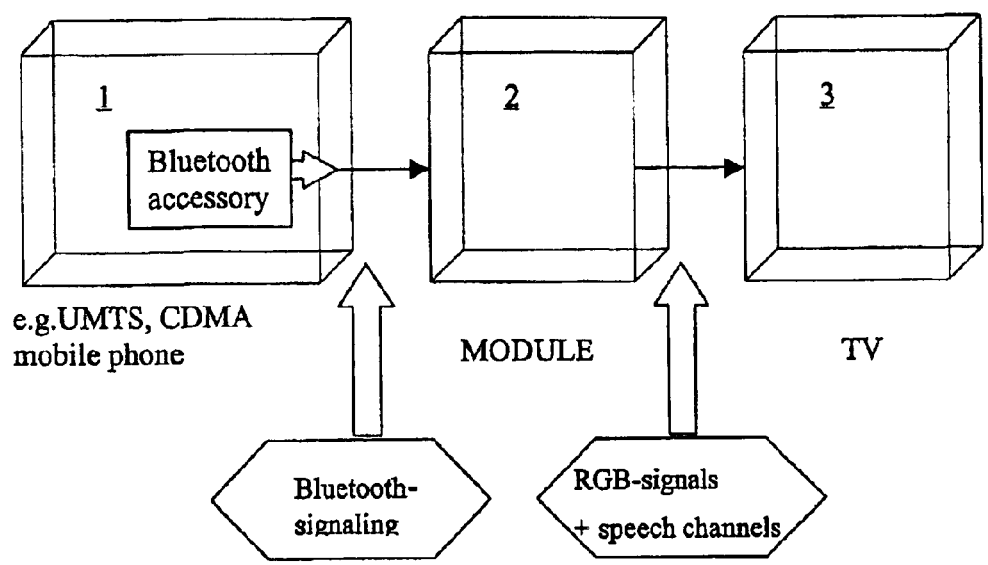

METHOD OF TRANSFERRING DATA OF SCREEN AND VOICE OF MOBILE PHONE TO A NORMAL ANALOG TELEVISION RECEIVER WITH AN ADAPTER

An object to this invention is a method according to the preamble in claim 1, for transmitting image and sound from a mobile phone to an ordinary analog television receiver using mobile phone accessory. The invention relates to third generation UMTS (Universal Mobile Telecommunications System) data terminal equipments, all kinds of GSM-applications, such as: WAP (Wireless Access Protocol), HSCSD (High Speed Circuit Switch Data), GPRS (General Packet Radio Service), EDGE (Enhanced Data Rates for GSM Evolution) and CDMA (Code Division Multiple Access) phones and IMT (International Mobile Telecommunication) 2000 data terminal equipments.

Previously known in the art is that mobile phones have their own displays where all information is viewed. So far the display has mainly been integrated to the phone device.

A problem with the technology mentioned above is that there are lot of applications where it does not do justice, such as viewing internet-pages or for a video phone function. In the near future these will become very utilized. On the other hand, because of the small display also watching video images will be problematic, despite that mobile phone displays are being developed and also slightly enlarged. Monitors which are developed for e.g. UMTS-mobile phones, will be very expensive and therefore are not suitable for most households, but only for working environment. In addition, many of the users suffer from poor eyesight, causing the smallness of the mobile phone display to be even more a bigger problem, for example, already when reading SMS messages.

The object to this invention is to eliminate inadequacies in the prior art and accomplish an altogether new method which can be used for transmitting information from a mobile phone display to an ordinary analog television screen and at the same time transmitting sound to the television receiver, using a mobile phone accessory.

The invention is based on that an accessory module is attached to an ordinary analog home television receiver (3). Bluetooth technology is exploited in transmitting data from the mobile phone (1) to the accessory (2) attached to television. Because of its function, smallness and essence the accessory module is suitable as mobile phone accessory. The accessory module uses supply current.

The module (2) is coupled to the SCART-connector in the TV (3), the module having SCART-compatible connector parts. The module comprises a Bluetooth receiver (4) and a converter (5). Electricity supply comes from a separate transformer, which is connected to the 220V supply current.

The module (2) receives signals transmitted from the mobile phone, e.g. UMTS data terminal equipment, using the Bluetooth accessory and converts signals according to all types of different devices from each manufacturer, image signals into RGB-signals and sound signal parts into sound signals required by the TV.

More precisely the method according to the invention is characterized in that, the mobile phone (1) receives sound and image information from the mobile phone network and by pressing a certain soft key button the phone copies image information and control information from the display to the Bluetooth transmitter and unites sound information to those. Former takes place according to different types of phones from each manufacturer. After that the phone transmits it by Bluetooth transceiver equipment to an analog TV-receiver nearby (3), in which a module (2) is mounted. In addition to the actual converter part, the module comprises a receiving Bluetooth accessory, which receives image and sound transmitted by the mobile phone, e.g. UMTS data terminal equipment, and converts these to RGB-control signals and sound. This takes place according to different types of phones from each manufacturer. The Bluetooth receiver in the module is connected to a converter by using connection consistent with USB-standard.

Substantial advantages are achieved through this invention.

The invention enables that mobile phone, e.g. UMTS, CDMA, etc., will be used because of the new services much more than today, also in home usage. Viewing internet-pages, if there is no PC for home usage, can be done more consumer friendly through the already existing analog TV.

Furthermore, home usage of video phone is enabled through television screen and sound, for example when using UMTS at home, one can watch his/her dialog partner more clearly through a bigger TV-screen. Also a video received with the mobile phone can be watched through TV, when e.g. watching a movie turns out better and a satisfactory volume can be achieved.

Playing games received from a mobile phone network gets easier by using a TV-screen. Altogether watching bigger images from TV in spare time compared to a mobile phone display creates ease in use.

Signaling Explanation:

The patent does not respond to the mobile phone function regarding to the radio network and thus does not intervene to the part of signaling where the radio network base station and mobile phone transmit and receive internationally agreed radio network signals.

The patent does neither respond to Bluetooth signaling, which adhere to internationally agreed signals.

The patent does neither respond to USB-signaling, which is based on international specifications.

Connection Explanation:

The mobile phone, e.g. UMTS data terminal equipment, connection is based on manufacturers methods and the patent does not respond to that.

The Bluetooth receiver connection to the converter is based on USB 1.1 specification or to a newer version.

The converter, which is based on signal processing, can process with USB-signaling and controlling with the Bluetooth part and converts image and sound information transmitted from the mobile phone to signals (RGB+sound) required by TV.

The module connection to TV

The module is connected physically and mechanically to the SCART-connector in the television.

Description of the Used SCART-Connection:

SCART Pin-configuration

1. Audio out, right, 0.5V rms/<1 kohm
2. Audio in, right, 0.5V rms/>10 kohm
3. Audio out, left/mono, 0.5V rms/<1 kohm
4. Audio ground
5. Blue ground
6. Audio in, left/mono 0.5V rms/>10 kohm
7. RGB blue, 0.7V 75 ohm
8. Function select, TV/AV, >10 kohm
9. Green ground
10. Comms data 2
11. RGB green, 0.7V 75 ohm
12. Comms data 1
13. Red ground
14. Data ground 15. RGB red, 0.7V 75 ohm
16. Blanking signal, video/RGB, 75 ohm
17. Composite video ground
18. Blanking signal ground
19. Composite video out 1V/75 ohm
20. Composite video in 1V/75 ohm
21. Shield Pin Description:

10, 12 and 14. Generally brand related controlling. These are not necessarily in use.

16. With this blanking signal transfer mode is chosen. 0–0.4 V=composite video. 1–3V=RGB-signal.

21. Shield. The connector metal frame is being coupled to this connection. In the conventional SCART-cable between the TV and the VCR, usually only pins 1, 2, 3, 4, 6, 8, 17, 19 and 20 are coupled.

Audio and video inputs and outputs are connected crosswise in the cable. Pin 8 is wired also from the other end to pin 8. Pins 4 and 17 are coupled from both ends to the cable protecting shield.

Module (2) Structure:

The module comprises a converter (5) and a Bluetooth part (4) and a connection cable (6) for the television SCART-connector. In addition the module is being connected to supply current (7) through small AC/DC-transformer.

Figure 2:
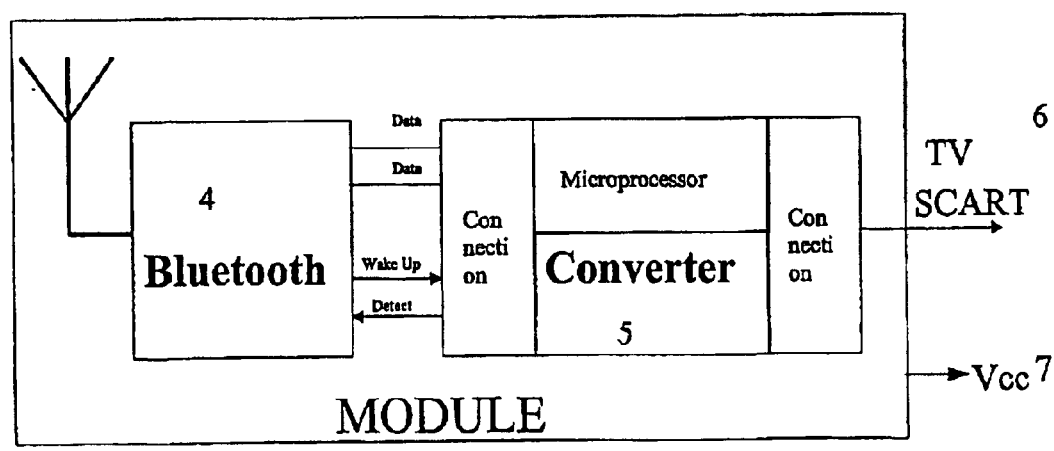

List of Drawings:

FIG. 1: Principle drawing
FIG. 2: Module structure

What is claimed is:

1. A method for transferring image and sound data from a mobile phone to a television, comprising:

generating a signal in the mobile phone from the image and sound data received by the mobile phone;

transmitting the signal in a format that conforms to a Bluetooth-protocol as an output signal from the mobile phone;

receiving the output signal from the mobile phone as an input signal at a module;

converting the input signal to image-sound signals in the module; and connecting the image-sound signals from the module to the television, wherein the module is a mobile telephone accessory located at the television.

2. The method according to claim 1, wherein connecting further comprises transmitting the image-sound signals to the television using a SCART-connection to the television.

3. The method according to claim 1, wherein the image-sound signals are a RGB+sound signal.

4. The method according to claim 1, wherein the television is an analog television.

5. The method according to claim 1, wherein converting further comprises transmitting an output from a Bluetooth receiver to a converter using a USB-connection, wherein the module comprises the Bluetooth receiver and the converter.

6. The method according to claim 5, wherein transmitting an output of a Bluetooth receiver further comprises using a version of a Universal Serial Bus (USB).

7. The method according to claim 6, wherein the version of the USB is 1.1.

* * * * *